US008477939B2

(12) United States Patent
Youn et al.

(10) Patent No.: US 8,477,939 B2

(45) Date of Patent: Jul. 2, 2013

(54) POLARIZATION-INSENSITIVE ONE-WAY QUANTUM KEY DISTRIBUTION RECEIVER, TRANSMITTER/RECEIVER SYSTEM

(75) Inventors: Chun Ju Youn, Daejeon (KR); Tae Gon Noh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 673 days.

(21) Appl. No.: 12/446,810

(22) PCT Filed: Nov. 28, 2007

(86) PCT No.: PCT/KR2007/006066

§ 371 (c)(1), (2), (4) Date: Apr. 23, 2009

(87) PCT Pub. No.: WO2008/069490

PCT Pub. Date: Jun. 12, 2008

(65) Prior Publication Data

US 2010/0002881 A1 Jan. 7, 2010

(30) Foreign Application Priority Data

Dec. 5, 2006 (KR) ........................ 10-2006-0122522
Jun. 12, 2007 (KR) ........................ 10-2007-0057090

(51) Int. Cl.
*H04L 9/00* (2006.01)

(52) U.S. Cl.
USPC ............................ 380/263; 380/256; 380/283

(58) Field of Classification Search
USPC .......................................... 380/256, 263, 283
See application file for complete search history.

(56) References Cited

U.S. PATENT DOCUMENTS 5,307,410 A * 4/1994 Bennett ......................... 380/256
6,438,234 B1 8/2002 Gisin et al.

(Continued)

FOREIGN PATENT DOCUMENTS

JP 2003-249928 A 9/2003
KR 1020030032012 A 4/2003
KR 1020040058326 A 7/2004
WO 98/10560 A1 3/1998

OTHER PUBLICATIONS

X. Mo eta l., Faraday-Michelson system for quantum cryptography, Oct. 1, 2005, Optics Letter, vol. 30, No. 19, pp. 1-3.*

(Continued)

*Primary Examiner* — Jung Kim
*Assistant Examiner* — Carlos M De Jesus, Jr.
(74) *Attorney, Agent, or Firm* — Ladas & Parry LLP

(57) ABSTRACT

Provided are an apparatus for receiving a quantum cryptographic key and an apparatus for transmitting and receiving a quantum cryptographic key at high speed without polarization drift of an optical pulse signal and phase drift of an interferometer. The apparatus for receiving a quantum key includes: a polarization-insensitive optical phase modulator parts for receiving an optical pulse signal, and modulating and outputting a phase of the optical pulse signal without being affected by the polarization state of the optical pulse signal; an asymmetric Mach-Zehnder interferometer for causing interference in and outputting the optical pulse signal received from the polarization-insensitive optical phase modulator parts; and a photon detectors for detecting the optical pulse signal received from the asymmetric Mach-Zehnder interferometer. According to the apparatuses, it is possible to perform quantum cryptography communication at high speed without being affected by polarization drift of an optical pulse signal and phase drift of an interferometer.

10 Claims, 2 Drawing Sheets

U.S. PATENT DOCUMENTS

| | | | | |
|---|---|---|---|---|
| 6,529,601 | B1 * | 3/2003 | Townsend | 380/256 |
| 7,596,322 | B2 * | 9/2009 | Tomaru et al. | 398/140 |
| 2004/0005056 | A1 * | 1/2004 | Nishioka et al. | 380/256 |
| 2004/0161109 | A1 | 8/2004 | Trifonov | |
| 2005/0078827 | A1 | 4/2005 | Tajima | |

OTHER PUBLICATIONS

Nambu et al., "One-way Quantum Key Distribution System based on Planar Lightwave Circuits", Mar. 2006, pp. 23, http://arxiv.org/abs/quant-ph/0603041.*

X. Mo et al., Faraday-Michelson system for quantum cryptography, Oct. 1, 2005, Optics Letter, vol. 30, No. 19, pp. 1-3.*

G. Bonfrate et al., Asymmetric Mach-Zehnder germano-silicate channel waveguide interferometers for quantum cryptography systems, Apr. 23, 2001, IEE, pp. 1-2 Http://ieeexplore.ieee.org/stamp/stamp.jsp?arnumber=00933415.*

Xiao-Fan Mo, et al; "Faraday-Michelson system for quantum cryptography" Optics Letters / vol. 30, No. 19 / Oct. 1, 2005, pp. 2632-2634.

G. Ribordy, et al; "Automated 'plug & play' quantum key distribution", Electronics Letters, Oct. 29, 1998, vol. 34, No. 22, pp. 2116-2117.

International Search Report; mailed Feb. 28, 2008; PCT/KR2007/006066.

* cited by examiner

Fig. 1 (PRIOR ART)

| Alice-basis | + | × | × | + | × | + | × | + |
|---|---|---|---|---|---|---|---|---|
| Alice-bit value | 1 | 0 | 1 | 1 | 0 | 0 | 0 | 1 |
| Bob-basis | + | × | + | × | × | + | + | + |
| Bob-bit value | 1 | 0 | 1 | 0 | 0 | 0 | 0 | 1 |
| After basis comparison (Sifted key) | 1 | 0 | - | - | 0 | 0 | - | 1 |

| Bit value | Polarization state corresponding to bit value | |
|---|---|---|
| 0 | ↔ | ⤢ |
| 1 | ↕ | ⤡ |

POLARIZATION-INSENSITIVE ONE-WAY QUANTUM KEY DISTRIBUTION RECEIVER, TRANSMITTER/RECEIVER SYSTEM

TECHNICAL FIELD

The present invention relates to a quantum key distribution receiver and a quantum key distribution transmitter/receiver, and more particularly, to apparatuses for receiving and transmitting/receiving a quantum cryptography key at high speed in optical fiber-based quantum cryptography communication.

BACKGROUND ART

In today's world, the widespread use of wired and wireless communication technology, such as the Internet, broadcasting, etc., has made it very important to protect and secure communication networks and individual terminals. In hopes of finding the ultimate solution to security issues, experts in the field are currently researching quantum cryptography technology whereby security is absolutely guaranteed based on principles of quantum mechanics rather than conventional complex mathematical calculations.

Protocols used in quantum cryptography technology include BB84 protocol, named after its inventors Charles Bennett and Gilles Brassard, E91 protocol using an Einstein-Podolsky-Rosen (EPR) state, B92 protocol developed by and named after C. H. Bennett in 1992, and so on. Among the protocols, the commonly used BB84 protocol, which uses the polarization state of a single photon, will now be described with reference to FIG. 1.

As illustrated in FIG. 1, BB84 protocol using the polarization state of a single photon uses 4 polarization states constituting 2 bases. In other words, a transmitter, Alice, randomly selects one of the two bases and randomly selects and transmits one of two quantum states 0 and 1, i.e., cryptographic key values, of the selected basis, to a receiver, Bob. The receiver who has received the quantum state also randomly selects one of the two bases and measures the received quantum state using the selected basis. After the receiver performs the measurement, the transmitter and the receiver tell each other the bases that they have randomly selected. Here, when the transmitter has selected the same basis as the receiver, the result measured by the receiver is the same as the quantum state randomly selected by the transmitter, and thus the two users have the same cryptographic key.

Meanwhile, a method using double asymmetric Mach-Zehnder interferometers (U.S. Pat. No. 5,307,410) is employed in conventional quantum cryptography systems. The method is simple but when a quantum cryptography system is constructed using a long-distance optical fiber between two users separated far apart from each other, polarization drift of an optical pulse signal passed through the optical fiber and phase drift of the interferometers must be compensated for. According to the method, it is possible to actively compensate for the polarization and phase drift, but it is expensive and impractical.

Meanwhile, a recently invented quantum cryptography technique ("Automated 'Plug & Play' Quantum Key Distribution," Electron Lett. 1998) automatically compensates for polarization drift of an optical pulse signal passed through an optical fiber and phase drift of an interferometer by transmitting the optical pulse signal in a round-trip using a Faraday mirror. However, such an automatically compensating quantum cryptography technique performs round-trip transmission, thus having a limited transmission rate due to Rayleigh Backscattering, whereby when an optical pulse signal propagates through an optical fiber, a part of the light is captured in the fiber and propagated in the backward direction.

DISCLOSURE OF INVENTION

Technical Problem

The present invention is directed to apparatuses for receiving and transmitting/receiving a quantum cryptography key at high speed without polarization and phase drift in quantum key distribution systems.

Technical Solution

One aspect of the present invention provides an apparatus for receiving a quantum cryptographic key, comprising: a polarization-insensitive optical phase modulator parts for receiving an optical signal photons and modulating and outputting a phase of the optical signal photons without being affected by a polarization state of the optical signal photons; an asymmetric Mach-Zehnder interferometer for causing interference in and outputting the optical signal photons received from the polarization-insensitive optical phase modulator parts; and photon detectors for detecting the optical signal photons received from the asymmetric Mach-Zehnder interferometer.

Another aspect of the present invention provides an apparatus for transmitting and receiving a quantum cryptographic key, comprising: a quantum key distribution transmitter unit including a light source for generating an optical pulse signal, a first asymmetric Mach-Zehnder interferometer for separating the optical pulse signal generated by the light source into two optical pulse signals on a time-axis and outputting the two optical pulse signals, a first optical phase modulator for modulating and outputting an optical phase of an input optical pulse signal, and a polarization controller disposed between the first asymmetric Mach-Zehnder interferometer and the first optical phase modulator and aligning a polarization state of an optical pulse signal output from the first asymmetric Mach-Zehnder interferometer with a predetermined input polarization axis of the first optical phase modulator; and a quantum key distribution receiver unit including a polarization-insensitive optical phase modulator parts for receiving an optical signal photons output from the quantum key distribution transmitter unit and modulating and outputting a phase of the optical signal photons regardless of polarization states of the optical signal photons, a second asymmetric Mach-Zehnder interferometer for causing interference in and outputting the optical signal photons received from the polarization-insensitive optical phase modulator parts, and photon detectors for detecting the optical signal photons received from the second Mach-Zehnder interferometer.

Advantageous Effects

According to the present invention, it is possible to perform quantum cryptography communication at high speed without being affected by polarization and phase drift in quantum key distribution systems. In addition, by performing passive compensation rather than active compensation, it is possible to build a system economically.

BRIEF DESCRIPTION OF THE DRAWINGS

FIG. 1 illustrates conventional polarization encoding BB84 protocol;

MODE FOR THE INVENTION

Hereinafter, exemplary embodiments of the present invention will be described in detail. However, the present invention is not limited to the exemplary embodiments disclosed below, but can be implemented in various forms. The below exemplary embodiments are provided to fully enable those of ordinary skill in the art to embody and practice the invention.

Figure 2:
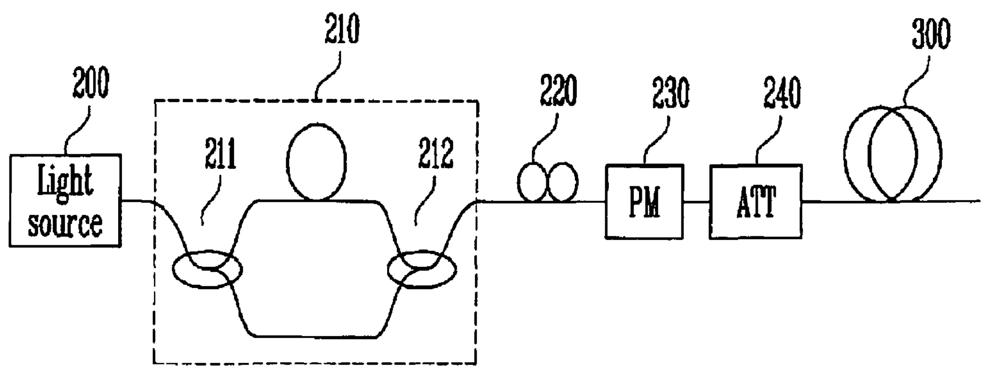
FIG. 2 is a block diagram of an apparatus for transmitting a quantum cryptographic key according to a first exemplary embodiment of the present invention.

FIG. 2 is a block diagram of an apparatus for transmitting a quantum cryptographic key according to a first exemplary embodiment of the present invention. The constitution and operation of the apparatus for transmitting a quantum cryptographic key according to the first exemplary embodiment of the present invention will be described in detail below with reference to FIG. 2.

The apparatus for transmitting a quantum cryptographic key according to the first exemplary embodiment of the present invention comprises a light source 200, an asymmetric Mach-Zehnder interferometer 210, a polarization controller 220, an optical phase modulator 230, and an optical attenuator 240.

The light source 200 generates an optical pulse signal and outputs it to the asymmetric Mach-Zehnder interferometer 210.

The asymmetric Mach-Zehnder interferometer 210 has two optical couplers 211 and 212 at its input end and output end, respectively. Here, the lengths of two paths connecting the optical couplers are different. The optical coupler 211 disposed at the input end of the asymmetric Mach-Zehnder interferometer 210 separates an input optical pulse signal into two optical pulse signals and outputs them to the long arm and the short arm, respectively. And, the optical coupler 212 disposed at the output end of the asymmetric Mach-Zehnder interferometer 210 combines the 2 optical pulse signals that have passed through different paths and outputs the combined signal to the polarization controller 220.

The polarization controller 220 aligns the polarization state of the input optical pulse signal with predetermined polarization axis of the optical phase modulator 230 and outputs it to the optical phase modulator 230.

The optical phase modulator 230 modulates the phase of the optical pulse signal output from the polarization controller 220 and outputs it to the optical attenuator 240.

The optical attenuator 240 decreases the intensity of the optical pulse signal output from the optical phase modulator 230 to about 0.1 photons per pulse, and then outputs it through an optical fiber.

Figure 3:
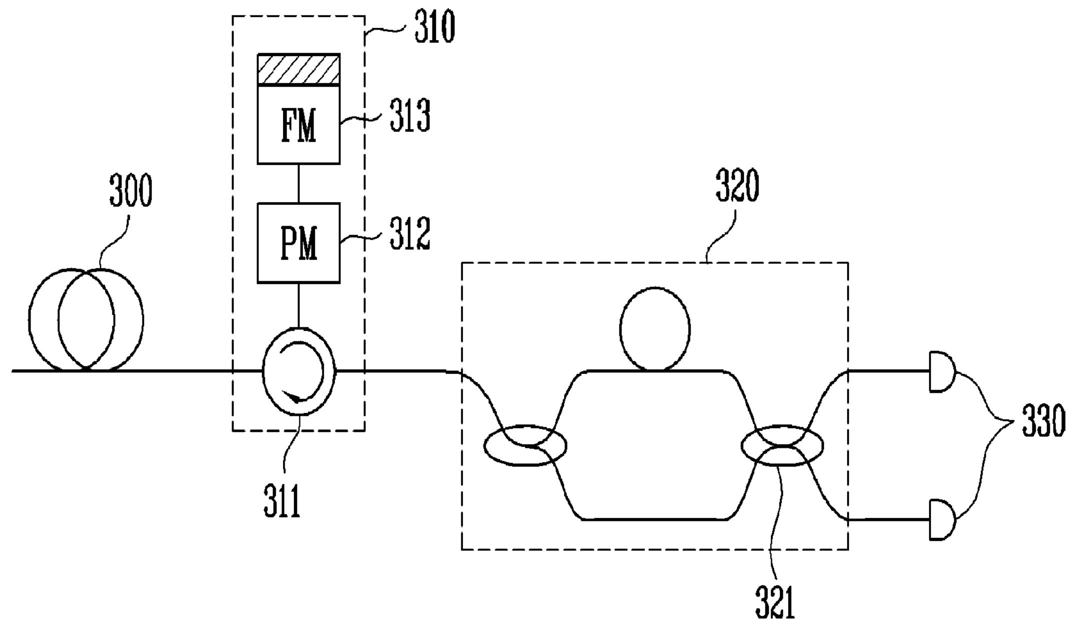
FIG. 3 is a block diagram of an apparatus for receiving a quantum cryptographic key according to a second exemplary embodiment of the present invention.

FIG. 3 is a block diagram of an apparatus for receiving a quantum cryptographic key according to a second exemplary embodiment of the present invention. The constitution and operation of the apparatus for receiving a quantum cryptographic key according to the second exemplary embodiment of the present invention will be described in detail below with reference to FIG. 3.

The apparatus for receiving a quantum cryptographic key according to a second exemplary embodiment of the present invention comprises a polarization-insensitive optical phase modulator parts 310, an asymmetric Mach-Zehnder interferometer 320, and photon detectors 330.

The polarization-insensitive optical phase modulator parts 310 is for modulating the phase of an input optical pulse signal regardless of the polarization state of the optical pulse signal, and includes an optical circulator 311, an optical phase modulator 312, and a Faraday mirror 313.

The optical circulator 311 outputs input optical pulse signal photons (referred to hereinafter as "optical signal photons") in only one direction according to the position of input ports. Referring to FIG. 3, the optical circulator 311 outputs optical signal photons output from an optical fiber 300 to the optical phase modulator 312 and optical signal photons output from the optical phase modulator 312 to the asymmetric Mach-Zehnder interferometer 320.

The optical phase modulator 312 modulates the phases of an optical signal photons received from the optical circulator 311 and an optical signal photons output from the Faraday mirror 313 according to quantum key distribution protocol.

The Faraday mirror 313 rotates the polarization state of optical signal photons from the optical phase modulator 312 by 90 degrees and reflects it back to the optical phase modulator 312.

In this way, the polarization-insensitive optical phase modulator parts 310 is formed by separating the optical phase modulator 312 from the asymmetric Mach-Zehnder interferometer 320.

The asymmetric Mach-Zehnder interferometer 320 causes interference in an optical signal photons received from the polarization-insensitive optical phase modulator parts 310 and outputs it to the photon detectors 330. Here, a first optical pulse signal passed through the long path of the first asymmetric Mach-Zehnder interferometer 210 of the apparatus for transmitting a quantum cryptographic key and the short path of the second asymmetric Mach-Zehnder interferometer 320 of the apparatus for receiving a quantum cryptographic key, interferes with a second optical pulse signal passed through the short path of the first asymmetric Mach-Zehnder interferometer 210 and the long path of the second asymmetric Mach-Zehnder interferometer 320. Here, the length of the path through which the first optical pulse signal is passed along the asymmetric Mach-Zehnder interferometers 210 and 320 is the same as the length of the path through which the second optical pulse signal is passed.

Since the Faraday mirror 313 rotates the polarization state of input optical signal photons by 90 degrees and reflects it back, the polarization-insensitive phase modulation can be made with optical phase modulator 312 and Faraday mirror 313. In addition, since the asymmetric Mach-Zehnder interferometer 210 disposed at the quantum key transmitter unit has the same path structure as the asymmetric Mach-Zehnder interferometer 320 disposed at the quantum key receiver unit, interference occurs at the optical coupler 321 disposed at the output end of the asymmetric Mach-Zehnder interferometer 320. In other words, the two optical pulse signals respectively pass through paths having the same length.

The photon detectors 330 detect input photons and generate an electrical signal. Here, depending on whether an optical signal photons output from the asymmetric Mach-Zehnder interferometer 320 causes constructive interference or destructive interference, a photon is detected at one of the two photon detectors 330.

Figure 4:
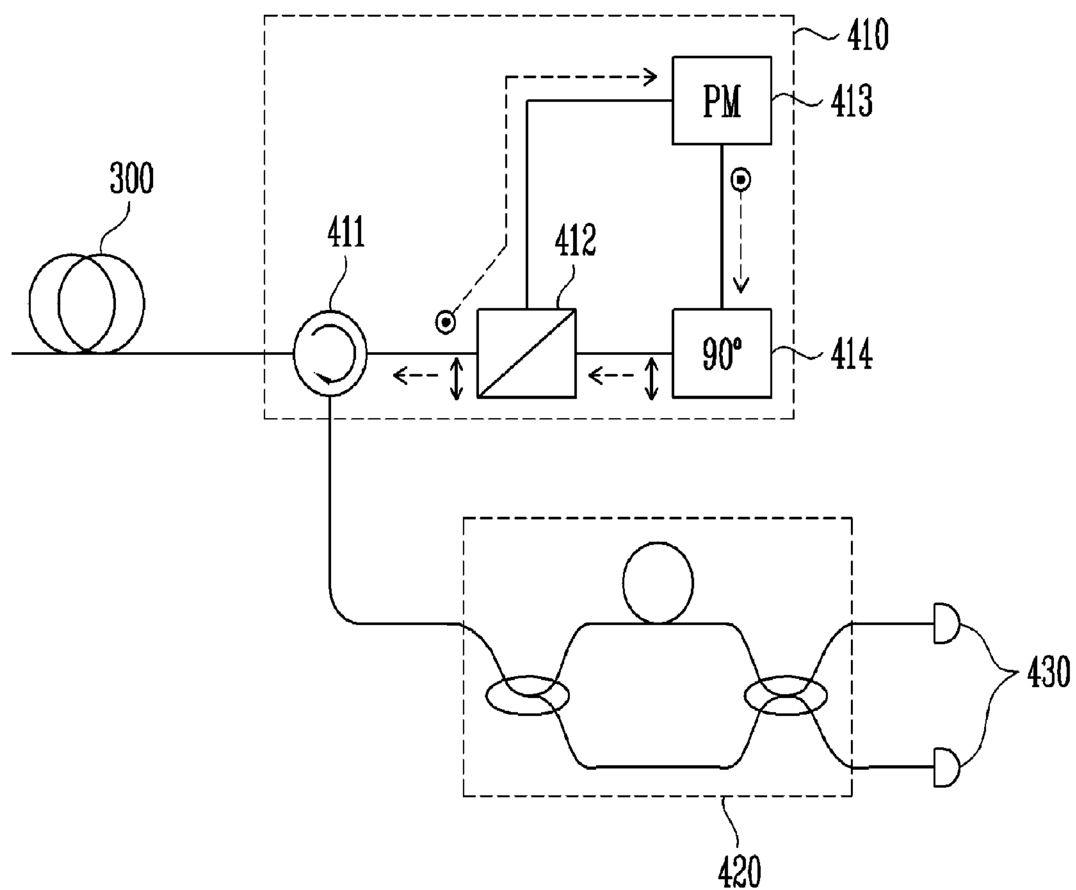
FIG. 4 is a block diagram of an apparatus for receiving a quantum cryptographic key according to a third exemplary embodiment of the present invention.

FIG. 4 is a block diagram of an apparatus for receiving a quantum cryptographic key according to a third exemplary embodiment of the present invention. The constitution and operation of the apparatus for receiving a quantum cryptographic key according to the third exemplary embodiment of the present invention will be described in detail below with reference to FIG. 4.

The apparatus for receiving a quantum cryptographic key according to a third exemplary embodiment of the present invention comprises a polarization-insensitive optical phase modulator parts 410, an asymmetric Mach-Zehnder interferometer 420, and photon detectors 430.

The polarization-insensitive optical phase modulator parts 410 is for modulating the phase of input optical signal photons regardless of the polarization state of the optical signal photons, and includes an optical circulator 411, a polarization beam splitter 412, an optical phase modulator 413, and a 90-degree polarization controller 414.

The optical circulator 411 outputs input optical signal photons in only one direction according to the position of input ports. Referring to FIG. 4, the optical circulator 411 outputs optical signal photons received from an optical fiber 300 to the polarization beam splitter 412 and an optical signal photons output from the polarization beam splitter 412 to the asymmetric Mach-Zehnder interferometer 420.

The polarization beam splitter 412 transmits or reflects input optical signal photons according to the polarization state of the optical signal photons. For example, a case will now be described in which an optical signal photons output from the optical circulator 411 and having two polarization components, i.e., TM (transverse-magnetic) polarization component and TE (transverse-electric) polarization component, perpendicular to each other, is incident on the polarization beam splitter 412. Here, when TM polarization component is reflected by the polarization beam splitter 412 and propagates to the optical phase modulator 413, TE polarization component is transmitted through the polarization beam splitter 412 and propagates to the 90-degree polarization controller 414.

The optical phase of TM polarization component reflected by the polarization beam splitter 412 is modulated by the optical phase modulator (assumption: optical phase modulator can modulate the optical phase of only TM polarization component) 413, and TM polarization component is output to the 90-degree polarization controller 414. The polarization state of TM polarization component is rotated by 90 degrees at the 90-degree polarization controller 414, and the polarization state rotated by 90 degrees is the same as the polarization state of TE polarization component before being output from the optical circulator 411 to the polarization beam splitter 412. Therefore, TM polarization component rotated by 90 degrees is transmitted through the polarization beam splitter 412 and output to the optical circulator 411, and the optical circulator 411 outputs TM polarization component to the asymmetric Mach-Zehnder interferometer 420.

On the other hand, the polarization state of TE polarization component transmitted through the polarization beam splitter 412 is rotated by 90 degrees at the 90-degree polarization controller 414, and is converted to TM polarization component. The optical phase of original TE polarization component rotated by 90 degrees is modulated by the optical phase modulator 413, and the converted TM (the original TE) polarization component is output to the polarization beam splitter 412. Therefore, the original TE polarization component rotated by 90 degrees (the converted TM polarization component) is reflected by the polarization beam splitter 412 and output to the optical circulator 411, and the optical circulator 411 outputs the original TE polarization component to the asymmetric Mach-Zehnder interferometer 420.

Here, to modulate an optical phase regardless of the polarization state of an input optical signal photons, the length of a first optical path from reflection by the polarization beam splitter 412 to the optical phase modulator 413 may be the same as that of a second optical path from transmission through the polarization beam splitter 412 to the optical phase modulator 413 via the 90-degree polarization controller 414.

The asymmetric Mach-Zehnder interferometer 420 causes interference in and outputs optical signal photons received from the polarization-insensitive optical phase modulator parts 410 to the photon detectors 430. Here, a first optical pulse signal that has passed through the long path of the first asymmetric Mach-Zehnder interferometer 210 of the apparatus for transmitting a quantum cryptographic key and the short path of the second asymmetric Mach-Zehnder interferometer 420 of the apparatus for receiving a quantum cryptographic key, causes interference with a second optical pulse signal that has passed through the short path of the first asymmetric Mach-Zehnder interferometer 210 and the long path of the second asymmetric Mach-Zehnder interferometer 420. Here, the length of the path through which the first optical pulse signal has passed along the asymmetric Mach-Zehnder interferometers 210 and 420 is approximately the same within wavelength scale as that of the path through which the second optical pulse signal has passed.

In other words, the two optical pulse signals pass through paths having the same length.

The photon detectors 430 detect input photons and generate electrical signals. Here, according to whether an optical signal photons output from the asymmetric Mach-Zehnder interferometer 420 causes constructive interference or destructive interference, a photon is detected at one of the two photon detectors 430.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An apparatus for receiving a quantum cryptographic key, comprising:

a polarization-insensitive optical phase modulator for receiving optical signal photons, and modulating and outputting a phase of the optical signal photons without being affected by a polarization state of the optical signal photons;

an asymmetric Mach-Zehnder interferometer for causing interference in and outputting the optical signal photons received from the polarization-insensitive optical phase modulator; and photon detectors for detecting the optical signal photons received from the asymmetric Mach-Zehnder interferometer, wherein the polarization-insensitive optical phase modulator is formed by separating an optical phase modulator from the asymmetric Mach-Zehnder interferometer, and wherein the polarization-insensitive optical phase modulator comprises:

an optical circulator for outputting the input optical signal photons in only one direction according to the position of input ports;

a polarization beam splitter connected to the optical circulator, and reflecting the input optical signal photons along a first optical path or transmitting it along a second optical path according to the polarization state of the optical signal photons;

an optical phase modulator disposed between the polarization beam splitter and a 90-degree polarization controller, and modulating and outputting the phase of the optical signal photons, and wherein the 90-degree polarization controller is disposed between the polarization beam splitter and the optical phase modulator, and rotates the polarization state of the input optical signal photons by 90 degrees.

2. The apparatus of claim 1, wherein the polarization-insensitive optical phase modulator comprises:

an optical circulator for outputting the input optical signal photons in only one direction according to the position of input ports;

a Faraday mirror for rotating the polarization state of the input optical signal photons by 90 degrees and reflecting the optical signal photons back; and an optical phase modulator disposed between the optical circulator and the Faraday mirror, and modulating and outputting the phase of the optical signal photons.

3. The apparatus of claim 1, wherein the first optical path has approximately the same length as the second optical path.

4. An apparatus for transmitting and receiving a quantum cryptographic key, comprising:

a quantum key distribution transmitter unit comprising a light source for generating an optical pulse signal having optical signal photons, a first asymmetric Mach-Zehnder interferometer for separating the optical pulse signal generated by the light source into two optical pulse signals on a time-axis and outputting the two optical pulse signals, a first optical phase modulator for modulating and outputting an optical phase of an input optical pulse signal, and a polarization controller disposed between the first asymmetric Mach-Zehnder interferometer and the first optical phase modulator and aligning a polarization state of an optical pulse signal output from the first asymmetric Mach-Zehnder interferometer with predetermined polarization axis of the first optical phase modulator; and a quantum key distribution receiver unit comprising a polarization-insensitive optical phase modulator for receiving the optical signal photons output from the quantum key distribution transmitter unit and modulating and outputting a phase of the optical signal photons regardless of a polarization state of the optical signal photons, a second asymmetric Mach-Zehnder interferometer for causing interference in and outputting the optical signal photons received from the polarization-insensitive optical phase modulator, and photon detectors for detecting the optical signal photons received from the second Mach-Zehnder interferometer, wherein the polarization-insensitive optical phase modulator is formed by separating an optical phase modulator from the second asymmetric Mach-Zehnder interferometer, and wherein the polarization-insensitive optical phase modulator comprises:

an optical circulator for outputting the input optical signal photons in only one direction according to the position of input ports;

a polarization beam splitter connected to the optical circulator, and reflecting the input optical signal photons along a first optical path or transmitting it along a second optical path according to the polarization state of the optical signal photons;

a third optical phase modulator disposed between the polarization beam splitter and a 90-degree polarization controller, and modulating and outputting the phase of the optical signal photons, and wherein the 90-degree polarization controller is disposed between the polarization beam splitter and the third optical phase modulator, and rotates the polarization state of the input optical signal photons by 90 degrees.

5. The apparatus of claim 4, wherein the first asymmetric Mach-Zehnder interferometer has approximately the same path length within wavelength scale as the second asymmetric Mach-Zehnder interferometer.

6. The apparatus of claim 4, further comprising:

an optical attenuator for decreasing the intensity of the optical pulse signal output from the first optical phase modulator to the intensity of a quantum level.

7. The apparatus of claim 4, wherein the polarization-insensitive optical phase modulator comprises:

an optical circulator for outputting the input optical signal photons in only one direction according to the position of input ports;

a Faraday mirror for rotating the polarization state of the input signal photons by 90 degrees and reflecting the optical signal photons back; and a second optical phase modulator disposed between the optical circulator and the Faraday mirror, and modulating and outputting the phase of the optical signal photons.

8. The apparatus of claim 4, wherein the first optical path has approximately the same length as the second optical path.

9. An apparatus for receiving a quantum cryptographic key, comprising:

a polarization-insensitive optical phase modulator for receiving an optical signal photons, and modulating and outputting a phase of the optical signal photons without being affected by a polarization state of the optical signal photons, wherein the polarization-insensitive optical phase modulator comprises:

an optical circulator for outputting the input optical signal photons in only one direction according to the position of input ports, a polarization beam splitter connected to the optical circulator, and reflecting the input optical signal photons along a first optical path or transmitting it along a second optical path according to the polarization state of the optical signal photons, an optical phase modulator disposed between the polarization beam splitter and 90-degree polarization controller, and modulating and outputting the phase of the optical signal photons, and a 90-degree polarization controller disposed between the polarization beam splitter and the optical phase modulator, and rotating the polarization state of the input optical signal photons by 90 degrees;

an asymmetric Mach-Zehnder interferometer for causing interference in and outputting the optical signal photons received from the polarization-insensitive optical phase modulator; and photon detectors for detecting the optical signal photons received from the asymmetric Mach-Zehnder interferometer.

10. An apparatus for transmitting and receiving a quantum cryptographic key, comprising:

a quantum key distribution transmitter unit comprising a light source for generating an optical pulse signal, a first asymmetric Mach-Zehnder interferometer for separating the optical pulse signal generated by the light source into two optical pulse signals on a time-axis and outputting the two optical pulse signals, a first optical phase modulator for modulating and outputting an optical phase of an input optical pulse signal, and a polarization controller disposed between the first asymmetric Mach-Zehnder interferometer and the first optical phase modulator and aligning a polarization state of an optical pulse signal output from the first asymmetric Mach-Zehnder interferometer with a predetermined polarization axis of the first optical phase modulator; and a quantum key distribution receiver unit comprising a polarization-insensitive optical phase modulator comprising:

an optical circulator for outputting the input optical signal photons in only one direction according to the position of input ports, a polarization beam splitter connected to the optical circulator, and reflecting the input optical signal photons along a first optical path or transmitting it along a second optical path according to the polarization state of the optical signal photon, a third optical phase modulator disposed between the polarization beam splitter and a 90-degree polarization controller, and modulating and outputting the phase of the optical signal photons, and wherein the 90-degree polarization controller is disposed between the polarization beam splitter and the third optical phase modulator, and rotates the polarization state of the input optical signal photons by 90 degrees, the polarization-insensitive optical phase modulator for receiving optical signal photons output from the quantum key distribution transmitter unit and modulating and outputting a phase of the optical signal photons regardless of a polarization state of the optical signal photons, and wherein the quantum key distribution receiver unit further comprises a second asymmetric Mach-Zehnder interferometer for causing interference in and outputting the optical signal photons received from the polarization-insensitive optical phase modulator, and photon detectors for detecting the optical signal photons received from the second Mach-Zehnder interferometer.

* * * * *